United States Patent [19]

Ukrainsky

[11] Patent Number: 4,748,546

[45] Date of Patent: May 31, 1988

[54] FLUORESCENT BACKLIGHTING UNIT

[75] Inventor: Orest J. Ukrainsky, Livingston, N.J.

[73] Assignee: Allied-Signal Inc., Morris Township, Morris County, N.J.

[21] Appl. No.: 9,852

[22] Filed: Feb. 2, 1987

[51] Int. Cl.$^4$ .............................................. F21S 3/00
[52] U.S. Cl. ................................ 362/223; 362/260; 340/700; 350/345
[58] Field of Search .................... 350/345; 340/700; 362/223, 355, 260

[56] References Cited

U.S. PATENT DOCUMENTS

| | | | |
|---|---|---|---|
| 3,879,723 | 4/1975 | Hornung | 340/765 |
| 4,285,029 | 8/1981 | McCoy | 350/345 |
| 4,346,378 | 8/1982 | Shanks | 340/754 |
| 4,486,499 | 12/1984 | Morimoto | 350/357 |
| 4,559,480 | 12/1985 | Nobs | 340/766 |
| 4,618,216 | 10/1986 | Suzawa | 350/345 |
| 4,630,894 | 12/1986 | Cremers | 350/338 |

*Primary Examiner*—Charles J. Myhre
*Assistant Examiner*—David A. Okonsky
*Attorney, Agent, or Firm*—Howard G. Massung

[57] ABSTRACT

A lighting unit (11) for providing diffused light is particularly useful for back illumination of a flat panel active matrix display (21). The unit (11) includes one or more fluorescent lamp tubes (13,15) which are embedded in RTV rubber or other transparent potting material (29). A pair of diffusing layers (31,35) cause the light output from the unit (11) to be evenly distributed. A ground plane (27) acts as a reflector, a heat sink and permits partial-power operation. Advantages include reduced flicker and an ability to withstand rough service.

13 Claims, 1 Drawing Sheet

FLUORESCENT BACKLIGHTING UNIT

BACKGROUND OF THE INVENTION

This invention relates to electric illumination, and more specifically to a fluorescent lighting unit capable of providing an even, diffused lighting source. It has particular utility as a backlighting unit for twisted nematic liquid crystal displays.

Flat panel displays are used in the avionics field as a substitute for cathode ray tube (CRT) displays. In addition to reduced bulk, such displays are capable of withstanding increased mechanical stresses and require less power to operate. They further avoid the use of electron and diflection circuits common to CRTs. One type of flat panel display utilizes twisted nematic liquid crystals. More often provided without backlighting, such displays can be illuminated impaired. Such displays may be either in full color or monochromatic. It may also be desirable to operate such displays in a manner which is compatible with night vision goggles, wherein light from the display does not adversely interfere with the operation of the night vision goggles. The illumination level of the display is sometimes adjusted in order to compensate for differences in ambient lighting conditions. For example, during nighttime operations, it is desired that the lighting level of an aircraft cockpit or similar environment not greatly exceed that of the ambient environment, as viewed by the crew member.

One difficulty in the operation of fluorescent lighting devices is that flicker tends to occur during conditions of low illumination, such as in cold ambient conditions or reduced operating voltage when the lighting circuit is dimmed.

Accordingly, it is desired that to provide an illumination source which has an even light distribution and whose light output can be readily controlled. It may be desired that the light output be provided in particular colors which cooperate with twisted nematic liquid crystal substances to provide a desired color output or to reduce interference with night vision goggles. The light source should also be durable and capable of withstanding stresses such as those anticipated in the military cockpit environment.

SUMMARY OF THE INVENTION

In accordance with the present invention, a backlighting unit is constructed in which a fluorescent light source is embedded into transparent potting material. Potting material is also bonded to a conductive ground plane and a diffusion layer.

In the preferred embodiment, the potting material is RTV (room temperature vulcanizing) silicone and two diffusion layers are used above folded fluorescent tubes. The ground plane is placed below the tubes and has the advantage of reducing flickering during partial power operation of the tubes.

The lighting unit is particularly advantageous as a backlighting unit for illuminating flat panel displays.

DETAILED DESCRIPTION OF THE PREFERRED EMBODIMENT

Figure 1:
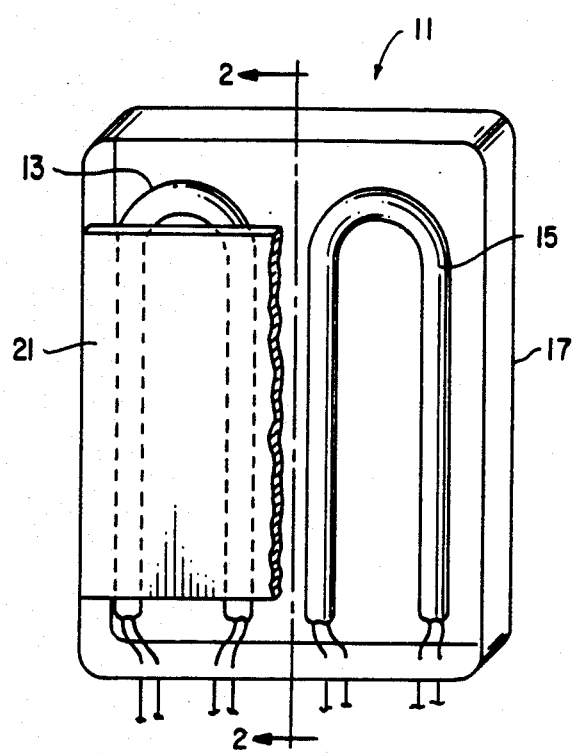
FIG. 1 shows a top, partially cross-sectioned view of a lighting unit constructed in accordance with a preferred embodiment of the invention. Also shown in FIG. 1 is a liquid crystal display unit used in association with the lighting unit.
Figure 2:
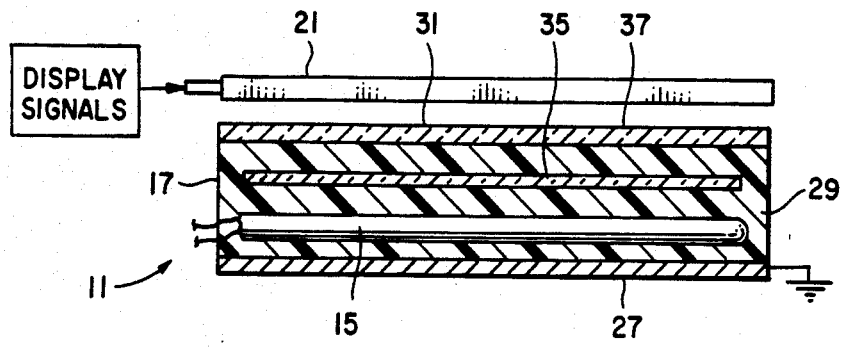
FIG. 2 is a side cross-sectional view of the liqhting unit of FIG. 1, taken along lines 2—2 of FIG. 1.

FIGS. 1 and 2 show a preferred embodiment of a backlighting lamp fixture 11 according to a preferred embodiment of the invention. Referring to FIG. 1, a pair of fluorescent lamp tubes 13, 15 are embedded within a housing 17 of the fixture 11. The tubes 13, 15 are provided with phosphorescent material in a conventional manner, except that the phosphors are selected in order to provide a desired spectral output when transmitted through a flat panel active matrix display such as liquid crystal display matrix 21 (shown in FIG. 2). The liquid crystal display matrix 21 uses twisted nematic liquid crystal substances which vary their light conductivity in accordance with electrical charges, in a manner known to those in the display arts. They can be provided as either transparent and opaque or as color displays. Additionally, color filters can be incorporated into the liquid crystal display matrix 21 in order to provide a desired color output when light is transmitted through the liquid crystal display matrix 21.

The tubes 13, 15 are placed in a closely adjacent relationship to a ground plane 27 which is a part of the housing 17. The ground plane 27, by its close proximity to the tubes 13, 15, permit the tubes 13, 15 to be operated at reduced illumination levels without noticeable flickering effects, as compared to operation of the tubes 13, 15 without such a ground plane. The tubes 13, 15 are embedded within the housing 17, by a potting agent 29. In the preferred embodiment, the potting agent is room temperature vulcanizing (RTV) silicone. The potting agent is transparent or translucent and also typically is a thermal insulator. The potting agent 29 must be able to withstand the thermal output of the fluorescent tubes 13, 15 and tends to stabilize the tubes 13, 15 in the adverse environments normally encountered in aerospace applications such as military cockpit displays and other vehicle displays. The close proximity of the ground plane 27 to the tubes 13, 15 permits the heat generated by the tubes 13, 15 to be transferred through the resultant thin layer of potting material 29 to the ground plane 27. The ground plane 27 is a thermal conductor and therefore acts as a heat sink for heat generated by the tubes 13, 15. The potting material 29 is relatively thick on a side of the tubes 13, 15 opposite the ground plane 27, and therefore only a small portion of the heat generated by the tubes 13, 15 is output through the top side 31 of the housing 17.

In order to provide an even output of light from the lamp unit 11, one or more diffusion layers 33, 35 are provided. In the preferred embodiment, two diffusion layers 35, 37 are provided, with one diffusion layer 35 being provided in the housing 17, embedded by the potting material 29 and the other diffusion layer 37 being provided at the top 31 of the housing 17 as a part of the housing 17. The diffusion layers 35, 37 diffuse the light output from the tubes 13, 15 in order to provide an evenly distributed light output from the lamp unit 17.

It is anticipated that the tubes 13, 15 will be provided with heaters in order that the tubes 13, 15 can be operated at reduced ambient tamperatures. Such heating means may consist of indium-tin oxide (I-T-O), coated onto the surfaces of the tubes 13, 15. Alternatively, internal heaters may be provided for the tubes 13, 15.

In one test unit, tubes were filled with phosphor consisting of cerium, terbium activated magnesium aluminate (Ce, Tb) (MgAl$_{11}$O$_{19}$). The tubes 13, 15 were not provided with separate heaters, other than their starters, and had a peak light emission at 541 nm. There were some minor peaks in light output at 405 nm and 436 nm as well as output at above 600 nm. The lamp unit 17 was able to perform at temperature cycles with varied from −55° C. to +55° C. When the ambient temperature was −55° C. the light output was approximately half the intensity of the light output at normal room temperature. The RTV potting material 29 showed no visible effects such as discoloration or determination, and an 8 g vibration cycle had no visible effect on the unit.

The lamp unit tested would not require substantial color filtration in order to provide night vision goggle (NVG) compatibility. It is possible to provide such NVG capability by providing minot color filtration at the diffusion layers 35, 37.

The unit tested incorporated a folded tube length of approximately 95 mm, including tube ends or approximately 200 mm unfolded. The tube diameter was approximately 7.9 mm, with 0.3 mm separation between the folded halves of the tube, provided a valuted tube width of approximately 19 mm.

It is anticipated that production monochromatic displays will use a phosphor which should provide a 504 nm peak output. Multicolor filtration could be achieved at the diffusion layers 35, 37, or by a separate multicolor filter either above or below the liquid crystal display matrix 21. The fluorescent tubes 13, 15 could also be provided with two or more light wavelength peaks in order to enable the use of multicolor displays with this backlighting unit. Because the tubes 13, 15 are direct fluorescing tubes, the light output of the tubes 13, 15 could be blanked in accordance with a technique described in U.S. patent application No. 786,270, commonly assigned with this patent.

From the above, it is clear that numerous embodiments can be constructed using the inventive concepts described herein. Accordingly, the invention should be limited only as defined in the claims.

I claim:

1. Flat panel type display unit in which an optically passive active matrix display panel provides a display by means of changes in light transmissivity patterns on the panel, and further including a light source located behind the display panel, in which the light display selectively transmits light from the light source in order to provide a visual display of information, characterized by:
    (a) the light source including at least one fluorescent lamp;
    (b) the fluorescent lamp being embedded in a substantially transparent potting material;
    (c) a conductive backplane located in close proximity to the fluorescent lamp; and
    (d) at least one light diffusion substrate being intraposed between the fluorescent lamp and the display panel.

2. Display unit as described in claim 1, further characterized by:
    the conductive backplane being connected to a common potential which is at variance with an average potential applied to the lamp when the lamp is illuminated; and
    the conductive backplane being located sufficiently close to the fluorescent lamp to allow capacitive coupling between the fluorescent lamp and the conductive backplane.

3. Display unit as described in claim 2, further characterized by:
    the display panel being a flat panel active matrix display.

4. Display unit as described in claim 1, further characterized by:
    the conductive backplane being connected to a ground potential; and
    the conductive backplane being located sufficiently close to the fluorescent lamp to allow capacitive coupling between the fluorescent lamp and the conductive backplane.

5. Display unit as described in claim 4, further characterized by:
    the display panel being a flat panel active matrix display.

6. Display unit as described in claim 1, further characterized by:
    the display panel being a flat panel active matrix display.

7. Display unit as described in claim 1, further characterized by:
    at least one additional light diffusing layer, the additional light diffusing layer being embedded in the potting material.

8. Display unit as described in claim 7, further characterized by:
    the potting material being RTV (room temperature vulcanizing) silicone.

9. Display unit as described in claim 1, further characterized by:
    the potting material being RTV (room temperature vulcanizing) silicone.

10. Diffused light source having a front exterior surface characterized by:
    (a) the light source including at least one fluorescent lamp;
    (b) the fluorescent lamp being embedded in a substantially transparent potting material;
    (c) a conductive backplane located in close proximity to the fluorescent lamp;
    (d) at least one light diffusion substrate being intraposed between the fluorescent lamp and the front exterior surface; and
    (e) at least one additional light diffusing layer, the additional light diffusing layer being embedded in the potting material.

11. Display unit as described in claim 10, further characterized by:
    the conductive backplane being connected to a ground potential; and
    the conductive backplane being located sufficently close to the fluorescent lamp to allow capacitive coupling between the fluorescent lamp and the conductive backplane.

12. Display unit as described in claim 11, further characterized by:
    the potting material being RTV (room temperature vulcanizing) silicone.

13. Duplex unit as described in claim 10, further characterized by:
    the potting material being RTV (room temperature vulcanizing) silicone.

* * * * *